(12) United States Patent
Myers

(10) Patent No.: US 10,518,146 B2
(45) Date of Patent: Dec. 31, 2019

(54) GOLF CLUB HEAD HAVING STRESS-REDUCING FEATURES

(71) Applicant: Callaway Golf Company, Carlsbad, CA (US)

(72) Inventor: Matthew Myers, Carlsbad, CA (US)

(73) Assignee: Callaway Golf Company, Carlsbad, CA (US)

(*) Notice: Subject to any disclaimer, the term of this patent is extended or adjusted under 35 U.S.C. 154(b) by 0 days.

(21) Appl. No.: 16/521,276

(22) Filed: Jul. 24, 2019

(65) Prior Publication Data

US 2019/0344135 A1 Nov. 14, 2019

Related U.S. Application Data

(63) Continuation of application No. 15/960,316, filed on Apr. 23, 2018, now Pat. No. 10,369,435.

(60) Provisional application No. 62/507,640, filed on May 17, 2017.

(51) Int. Cl.
*A63B 53/04* (2015.01)
*A63B 53/06* (2015.01)
*F16G 11/12* (2006.01)

(52) U.S. Cl.
CPC ............. *A63B 53/06* (2013.01); *F16G 11/12* (2013.01); *A63B 53/0466* (2013.01); *A63B 2053/0412* (2013.01); *A63B 2053/0437* (2013.01)

(58) Field of Classification Search
CPC ...... A63B 2053/045; A63B 2053/0475; A63B 2053/0454
USPC .......................................... 473/324, 335–339
See application file for complete search history.

(56) References Cited

U.S. PATENT DOCUMENTS

| | | | |
|---|---|---|---|
| 8,608,585 B2* | 12/2013 | Stites ..................... | A63B 53/04 473/282 |
| 9,597,561 B1* | 3/2017 | Seluga ................... | A63B 53/06 |
| 9,987,527 B1* | 6/2018 | Myers ................. | A63B 53/0466 |
| 10,238,933 B1* | 3/2019 | Seluga ................... | A63B 53/06 |

* cited by examiner

*Primary Examiner* — Raeann Gorden
(74) *Attorney, Agent, or Firm* — Rebecca Hanovice; Michael Catania; Sonia Lari

(57) ABSTRACT

A golf club head with a face stress-reduction structure disposed proximate a rear surface of a striking face is disclosed herein. In particular, the structure is an adjustable tension cable assembly extending from an upper portion of the golf club head, preferably a return section, to a lower portion of the golf club head, preferably a sole portion, approximately parallel with the rear surface of the striking face. The cable assembly comprises a cable portion, a hollow sleeve, and a screw plug.

20 Claims, 11 Drawing Sheets

_US 10,518,146 B2_

GOLF CLUB HEAD HAVING STRESS-REDUCING FEATURES

CROSS REFERENCES TO RELATED APPLICATIONS

The present application is a continuation of U.S. patent application Ser. No. 15/960,316, filed on Apr. 23, 2018, and issued on Aug. 6, 2019, as U.S. Pat. No. 10,369,435, which claims priority to U.S. Provisional Patent Application No. 62/507,640, filed on May 17, 2017, the disclosure of each of which is hereby incorporated by reference in its entirety herein.

STATEMENT REGARDING FEDERALLY SPONSORED RESEARCH OR DEVELOPMENT

Not Applicable

BACKGROUND OF THE INVENTION

Field of the Invention

The present invention relates to a golf club head with stress-reducing features disposed proximate a striking face section, and specifically a cable assembly, the tension of which can be adjusted, that connects a crown or upper body portion with a sole or lower body portion via a hollow body interior.

Description of the Related Art

The prior art discloses various golf club heads having interior structures. For example, Kosmatka, U.S. Pat. No. 6,299,547 for a Golf Club Head With an Internal Striking Plate Brace, discloses a golf club head with a brace to limit the deflection of the striking plate, Yabu, U.S. Pat. No. 6,852,038 for a Golf Club Head And Method of Making The Same, discloses a golf club head with a sound bar, Galloway, U.S. Pat. No. 7,118,493 for a Multiple Material Golf Club Head, discloses a golf club head with a composite aft body having an interior sound component extending upward from a sole section of a metal face component, Seluga et al., U.S. Pat. No. 8,834,294 for a Golf Club Head With Center Of Gravity Adjustability, discloses a golf club head with a tube having a mass for adjusting the CG of a golf club head, and Dawson et al., U.S. Pat. No. 8,900,070 for a Weighted Golf Club Head discloses a golf club head with an interior weight lip extending from the sole towards the face. However, the prior art fails to disclose an interior structure that increases ball speed through reducing stress in the striking face section at impact, with a minimal increase in mass to the golf club head.

BRIEF SUMMARY OF THE INVENTION

The present invention is directed to a golf club head comprising interior structures disposed proximate a rear surface of a striking face, the structures connecting an upper body portion to a lower body portion to reduce the stress in the striking face during impact with a golf ball. The interior structures preferably are cables, the tension of which can be adjusted with a tool.

One aspect of the present invention is a golf club head comprising a body comprising a crown section, a face section, and a sole section, and at least one cable assembly comprising a cable portion having a first diameter, a first connector, and a second connector, a sleeve comprising a through opening, a sleeve flange at least partially encircling the through opening, and a wall portion at least partially defining a hollow interior and having an exterior surface, an interior surface comprising a first plurality of threads, and at least one slot extending from a terminal edge of the wall, and a plug comprising an upper surface having a tool engagement portion, a lower surface, and an exterior surface comprising a second plurality of threads sized to engage with the first plurality of threads, wherein each of the first connector and second connector has a diameter that is greater than the first diameter, wherein one of the crown section and the sole section comprises a first through-bore at least partially encircled by a retention flange, wherein the other of the crown section and the sole section comprises a second through-bore comprising a retention structure, wherein the retention structure comprises at least one strut sized to fit within the at least one slot and an abutment portion suspended within the second through-bore by the at least one strut, wherein the cable portion extends through the first through-bore so that the first connector abuts the retention flange, wherein the cable portion extends through the through opening of the sleeve so that the second connector is disposed within the hollow interior and abuts the sleeve flange, wherein the at least one strut is disposed within the at least one slot so that the base is received within the hollow interior of the cap, and wherein the plug is disposed within hollow interior of the sleeve so that the first plurality of threads engages the second plurality of threads and the lower surface abuts the abutment portion.

In some embodiments, the sleeve may be approximately bell-shaped. In other embodiments, the at least one slot may comprise first, second, third, and fourth slots, and the retention structure may comprise first, second, third, and fourth struts. In some embodiments, the first connector may be a first ball joint and the second connector may be a second ball joint. In a further embodiment, the first ball joint may be permanently affixed to a first end of the cable portion and the second ball joint may be permanently affixed to a second end of the cable portion. In any of the embodiments, each of the first through-bore and the second through-bore may be disposed within 1 inch of the face. In some embodiments, the first and second through-bores may be vertically aligned with each other along a vertical plane extending parallel with an internal surface of the face. In any of the embodiments, tightening the plug within the sleeve may place the cable portion in tension, and loosening the plug within the sleeve may reduce tension in the cable portion. In any of the embodiments, the cable portion may comprise braided wire, and no portion of the cable assembly may be spaced further than 1.00 inch from an interior surface of the face section along a vertical plane extending perpendicular to the face section.

Another aspect of the present invention is a driver-type golf club head comprising a body comprising a striking face, a sole extending from a lower edge of the striking face, a return section extending from an upper edge of the striking face, and an aft end opposite the striking face, the return section and sole defining an upper opening, and the striking face, sole, and return section defining a hollow body interior, a crown section sized to cover the upper opening, a cable assembly comprising a plurality of upper cable portions, a lower cable portion, and a connector hub connecting each of the plurality of upper cable portions to the lower cable portion, a hollow sleeve comprising a wall having a plurality of anti-rotation slots and an internal surface having a first plurality of threads; and a plug comprising an upper surface having a tool engagement portion, a lower surface, and an external surface having a second plurality of threads, the second plurality of threads sized to engage with the first plurality of threads, wherein each of the upper cable portions is affixed to the return section, wherein the hollow sleeve is affixed to a lower end of the lower cable portion, wherein the sole section comprises a port with a through bore and a retention structure, wherein the retention structure comprises a plurality of struts supporting an abutment portion suspended over the through bore, wherein each of the plurality of struts is disposed within one of the plurality of anti-rotation slots so that the abutment portion is received within the hollow interior of the sleeve, and wherein the plug is disposed within a hollow interior of the sleeve so that the first plurality of threads engages the second plurality of threads and the lower surface abuts the abutment portion.

In some embodiments, the plurality of upper cable portions may comprises three upper cable portions, and tightening the plug within the sleeve may place at least one of the upper and lower cable portions in tension. In these embodiments, no portion of the cable assembly may be spaced further than 0.500 inch from an interior surface of the striking face along a vertical plane extending perpendicular to the striking face, and in a further embodiment, the cable assembly may be located within 0.250 inch of the interior surface of the striking face.

Yet another aspect of the present invention is a golf club head comprising a body comprising a striking face, an upper body portion extending away from an upper edge of the striking face, and a lower body portion extending away from a lower edge of the striking face, a y-shaped cable assembly comprising first and second upper cable portions affixed to a lower cable portion, a hollow sleeve comprising a wall having a plurality of anti-rotation slots and an internal surface having a first plurality of threads, and a plug comprising an upper surface having a tool engagement portion, a lower surface, and an external surface having a second plurality of threads, the second plurality of threads sized to engage with the first plurality of threads, wherein upper ends of each of the upper cable portions engage the upper body portion, wherein the hollow sleeve is affixed to a lower end of the lower cable portion, wherein the lower body portion comprises a port with a through bore and a retention structure, wherein the retention structure comprises a plurality of struts supporting an abutment portion suspended within the through bore, wherein each of the plurality of struts is disposed within one of the plurality of anti-rotation slots so that the abutment portion is received within the hollow interior of the sleeve, wherein the plug is disposed within the hollow interior of the sleeve so that the first plurality of threads engages the second plurality of threads and the lower surface abuts the abutment portion, and wherein no portion of the cable assembly is spaced further than 1.00 inch from an interior surface of the striking face along a vertical plane extending perpendicular to the striking face.

In some embodiments, the lower end of the lower cable portion may comprise a ball joint that retains the hollow sleeve on the lower cable portion. In a further embodiment, the upper body portion may comprise a first through-bore having a first flange and a second through-bore having a second flange, the first upper cable portion may comprise a first upper ball joint, the second upper cable portion may comprise a second upper ball joint, the first upper cable portion may extend through the first through-bore so that the first upper ball joint abuts the first flange, and the second upper cable portion may extend through the second through-bore so that the second upper ball joint abuts the second flange. In another embodiment, the golf club head may further comprise a connector hub, which may connect the first and second upper cable portions to the lower cable portion. In yet another embodiment, no portion of the cable assembly may contact any portion of the striking face.

Having briefly described the present invention, the above and further objects, features, and advantages thereof will be recognized by those skilled in the pertinent art from the following detailed description of the invention when taken in conjunction with the accompanying drawings.

DETAILED DESCRIPTION OF THE INVENTION

Figure 1:
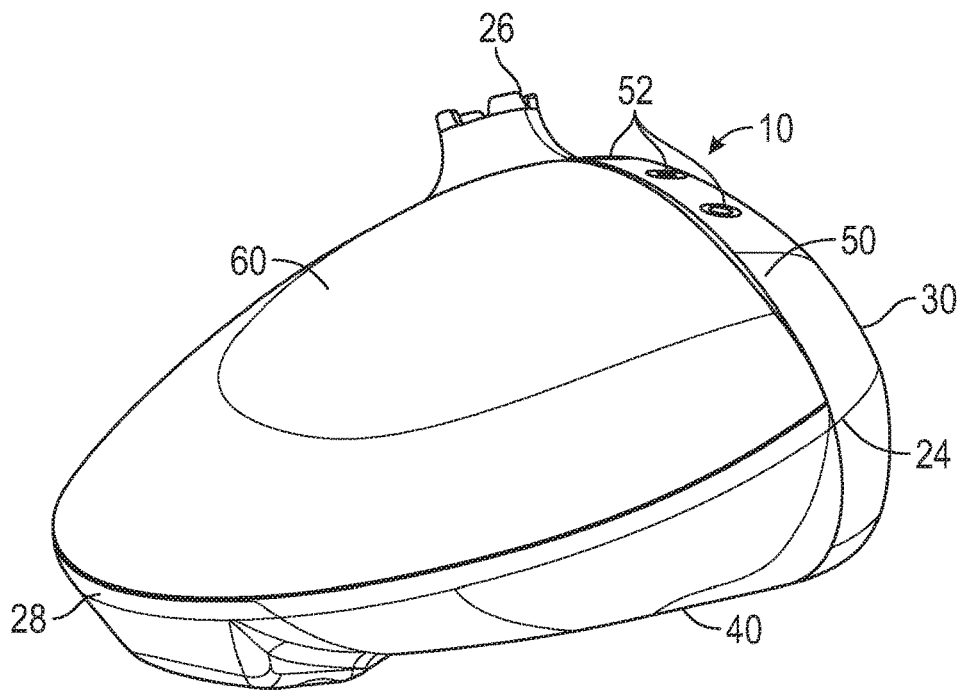
FIG. 1 is a side perspective view of a golf club head of the present invention.

The present invention is directed to a golf club head with at least one stiffening member, and particularly an adjustable-tension cable assembly, that extends between an upper portion (such as a crown or return section) of the golf club head and a lower portion (such as a sole section) of the golf club head proximate to, and approximately parallel with, a rear surface of a striking face section without touching the rear surface, even during impact with a golf ball.

The preferred embodiment of the present invention is shown in FIGS. 1-13. The golf club head 10 comprises a cast metal body 20 with a striking face section 30 having a face center 34 and a rear surface 36, a sole 40 extending rearwards from a lower edge 31 of the striking face section 30, a return section 50 extending rearwards from an upper edge 32 of the striking face section 30, a heel end 23, a toe end 24, a hosel 26 for engaging a shaft, and an aft end 28. The return section 50 has a maximum front to back length $L_1$ of less than 2 inches, and together, the sole section 40 and return section 50 define an upper opening 22 in the body 20 that communicates with a hollow body interior 25. The upper opening 22 is closed by a crown 60 that is adhered to the body 20 and encloses the hollow body interior 25.

Figure 2:
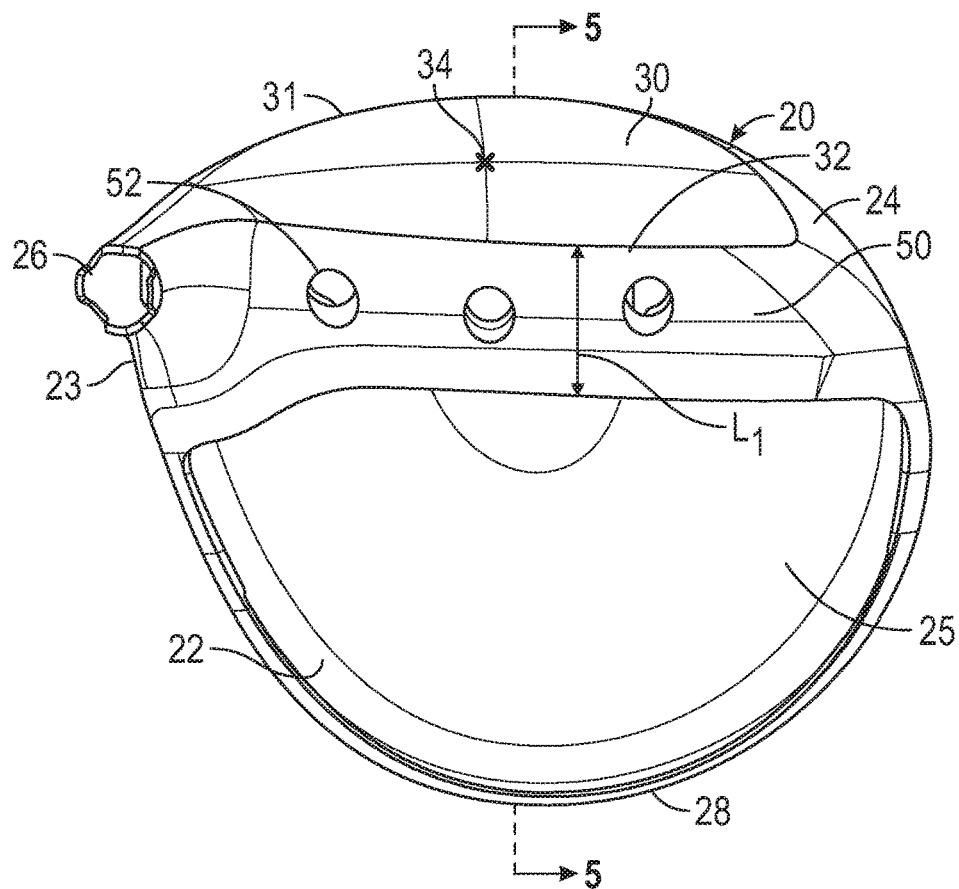
FIG. 2 is a top perspective view of the body of the golf club head shown in FIG. 1.
Figure 6:
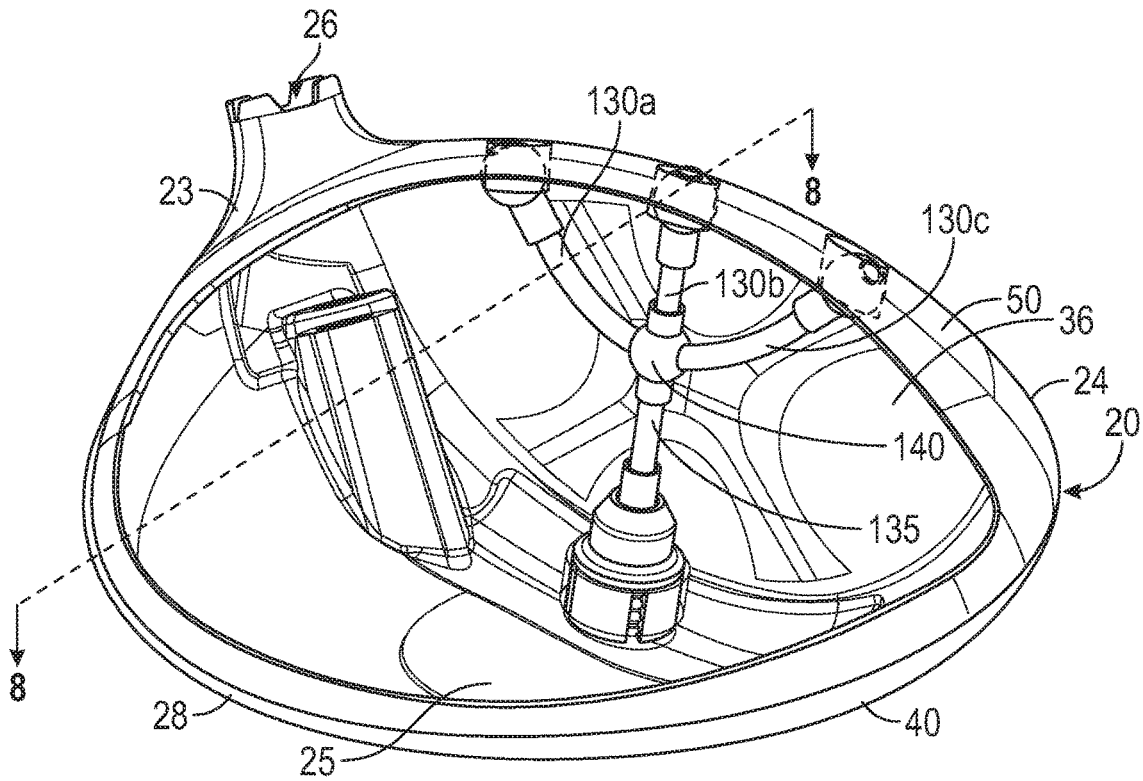
FIG. 6 is a partially transparent view of the body shown in FIG. 2 engaged with a tri-pronged cable assembly.
Figure 7:
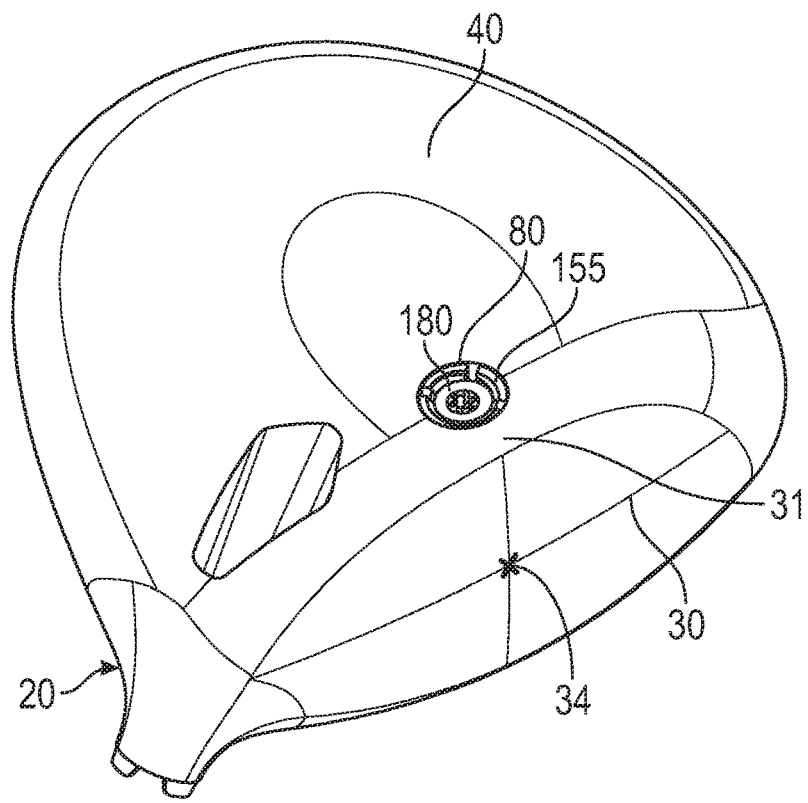
FIG. 7 is a sole elevational view of the embodiment shown in FIG. 6.

As shown in FIGS. 2 and 6, three unthreaded bores 52 extend through the return section 50 and communicate with the hollow body interior 25; each bore 52 includes a retention flange region 54 with an opening 56 having a diameter $D_2$ that is smaller than the diameter $D_1$ of the bore 52. Each flange region 54 preferably has a concave curvature to engage with the curvature of a ball joint connector 120.

Figure 3:
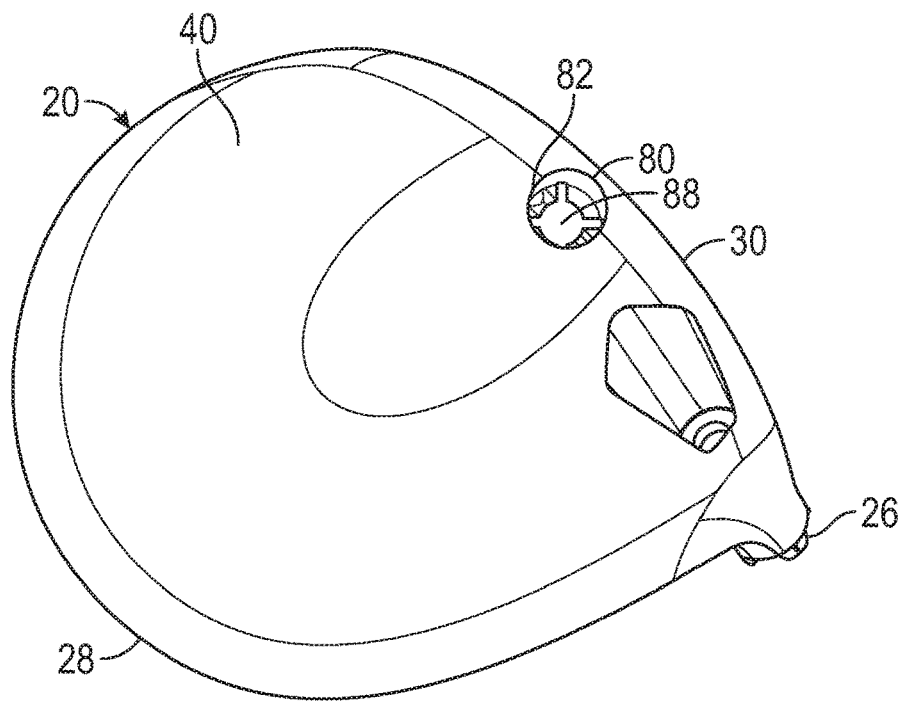
FIG. 3 is sole perspective view of the embodiment shown in FIG. 2.
Figure 4:
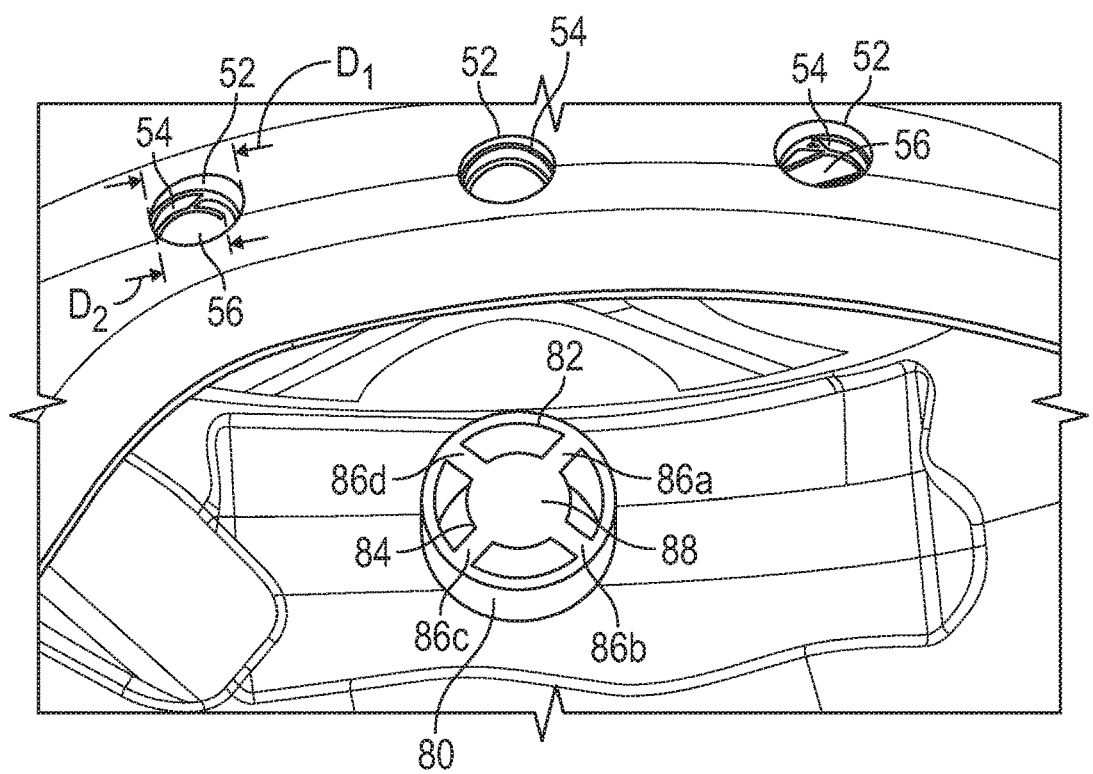
FIG. 4 is another top perspective view of the embodiment shown in FIG. 1.
Figure 5:
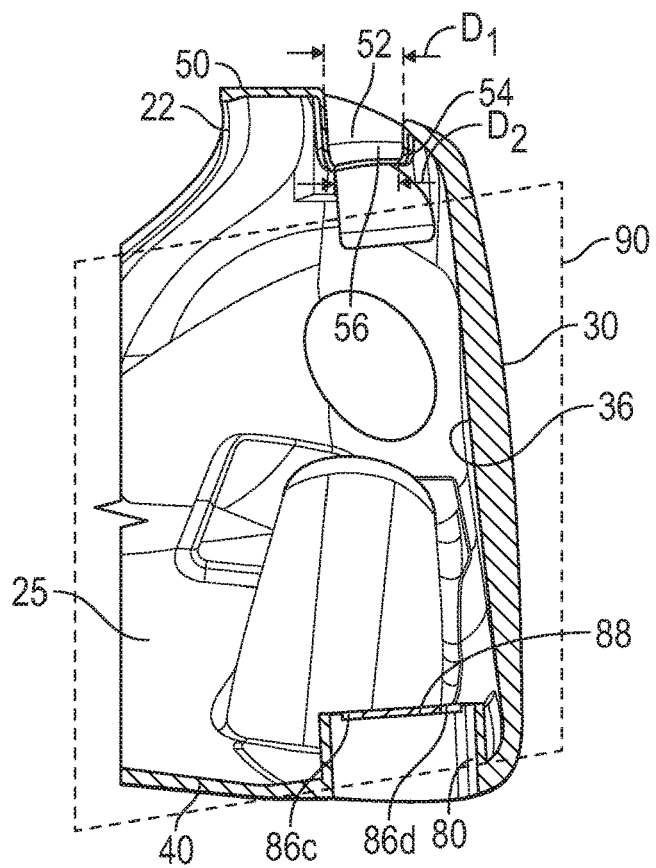
FIG. 5 is a cross-sectional view of the embodiment shown in FIG. 2 along lines 5-5.

As shown in FIGS. 3-5, the sole section 40 comprises a port 80 extending into the hollow body interior 25 of the body 20 and vertically aligned with one of the unthreaded bores 52 along a vertical plane 90 extending perpendicular to the striking face section 30. This port 80 includes a through-opening 82 that is divided up by a retention structure 84 comprising a plurality of struts 86a, 86b, 86c, 86d supporting an abutment portion 88 suspended within the through-opening.

Figure 8:
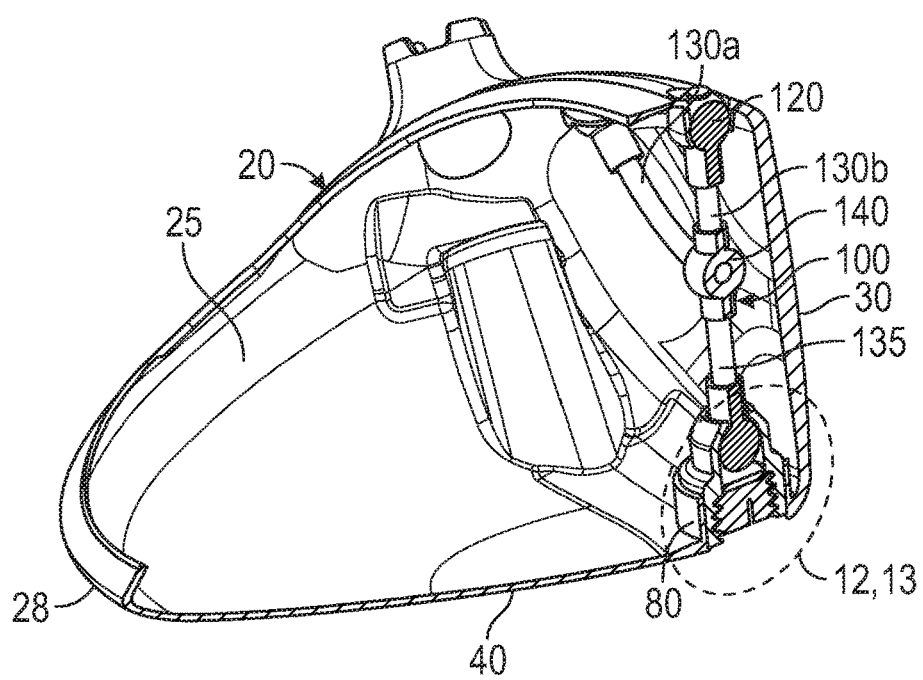
FIG. 8 is a cross-sectional view of the embodiment shown in FIG. 6 along lines 8-8.
Figure 9:
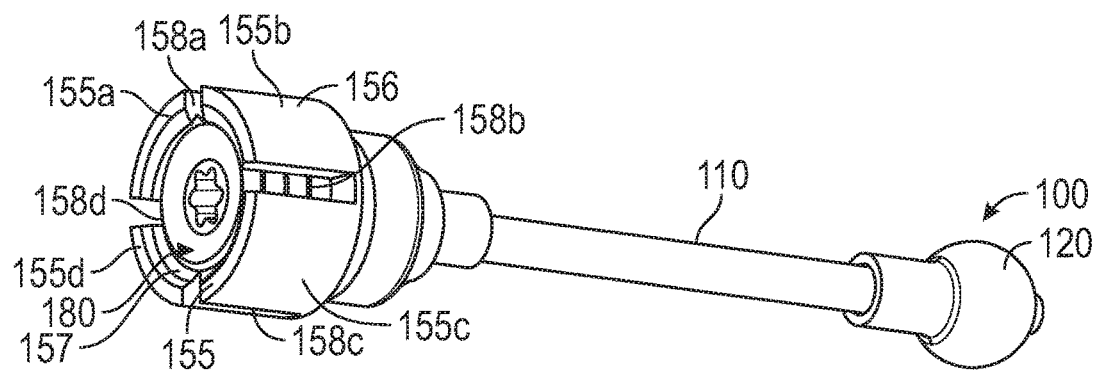
FIG. 9 is a side perspective view of an exemplary cable assembly of the present invention.
Figure 10:
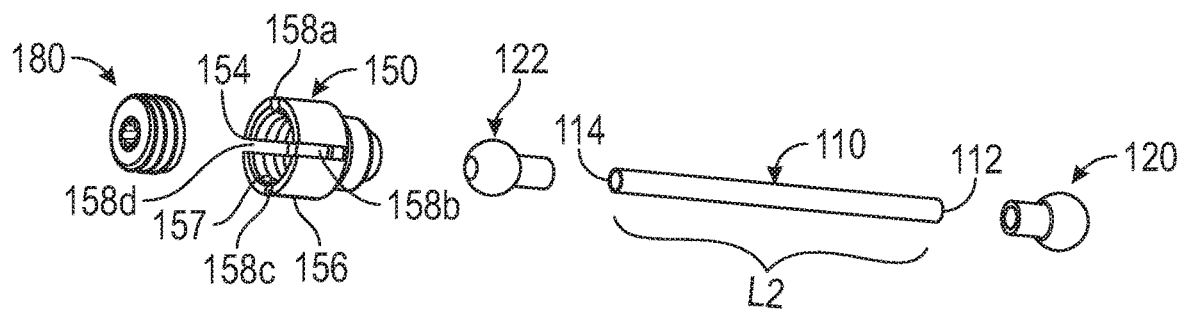
FIG. 10 is an exploded view of the cable assembly shown in FIG. 9.
Figure 11:
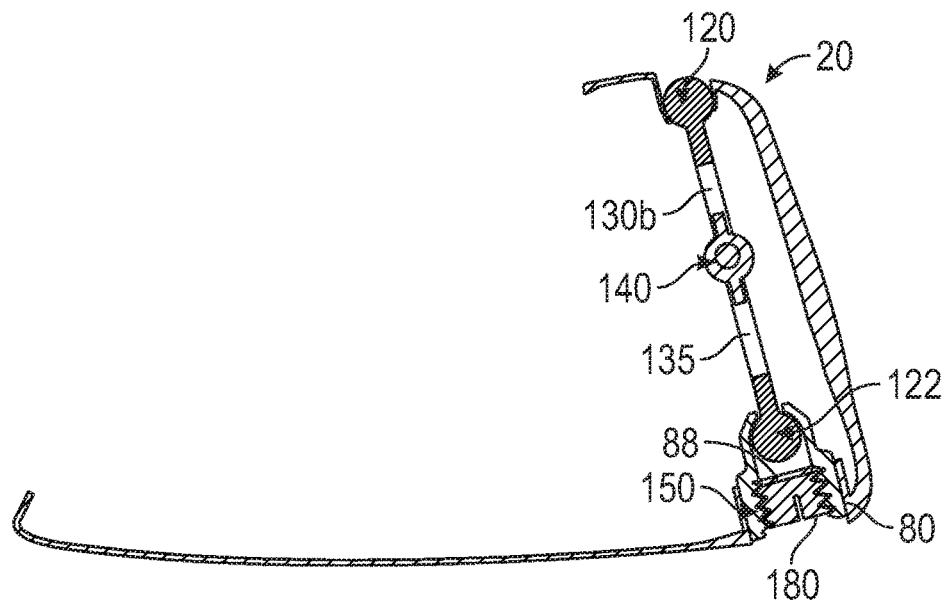
FIG. 11 is a line drawing of the cross-section shown in FIG. 8.
Figure 12:
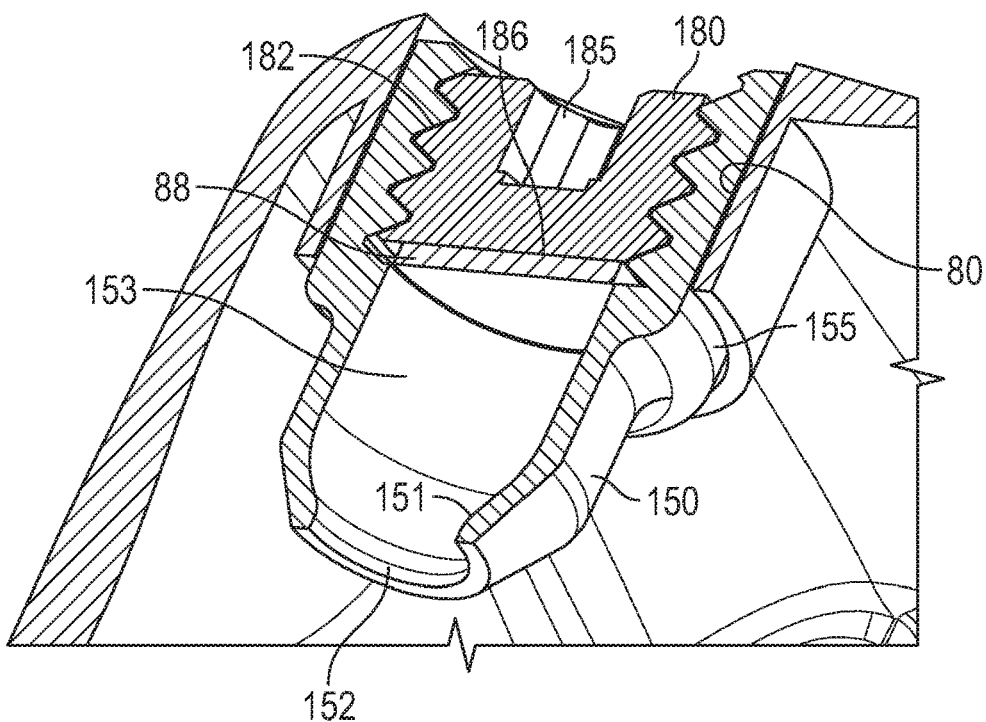
FIG. 12 is an enlarged view of the circled portion of the embodiment shown in FIG. 8, without the ball joint connector.
Figure 13:
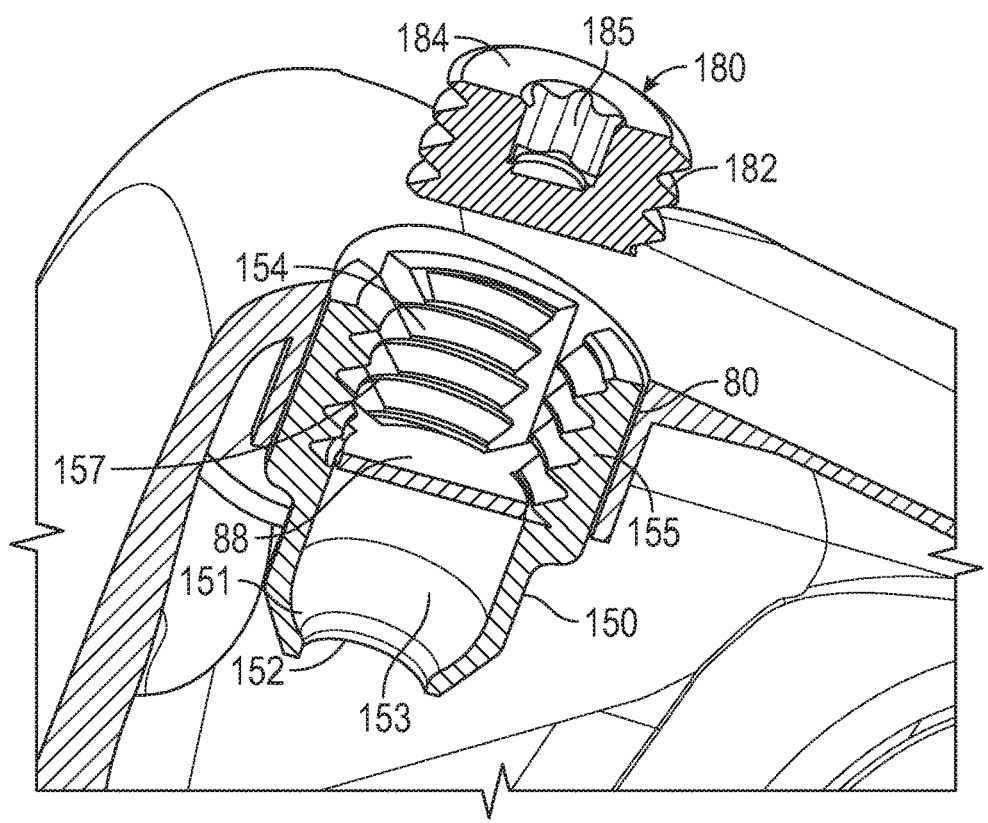
FIG. 13 is an exploded view of the embodiment shown in FIG. 12.
Figure 14:
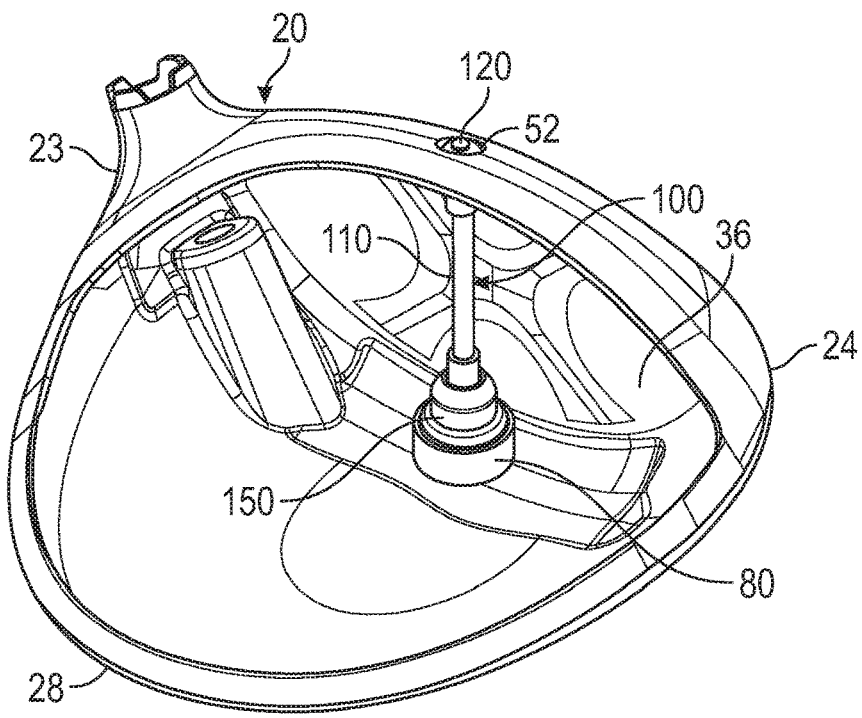
FIG. 14 is a top perspective view of an alternative embodiment of the golf club head of the present invention.

The unthreaded bores 52 and port 80 provide structural support for the novel cable assembly 100, hollow sleeve 150, and screw plug 180 shown in FIGS. 6-15. A simplified cable assembly 100, shown in FIGS. 9 and 10, comprises a cable portion 110, which preferably is composed of braided wire or another resilient material such as one or more polymers, having an upper end 112 and a lower end 114, and a pair of ball joint connectors 120, 122 that are attached to the upper and lower ends 112, 114 of the cable portion, respectively. The cable portion 110 may be tinted or otherwise colorized to improve the aesthetics of the cable assembly 100, which can be particularly appealing to a golfer if a window into the hollow body interior 25 is provided. As shown in FIGS. 6 and 8, the preferred embodiment of the present invention includes a cable assembly 100 having three upper cable portions 130a, 130b, 130c, each having an upper end 112 attached to a ball joint connector 120, which may be accomplished via welding, gluing, crimping, or other means known in the art. The three upper cable portions 130a, 130b, 130c are connected via a connector hub 140 to a single lower cable portion 135 having a lower end 114.

Figure 15:
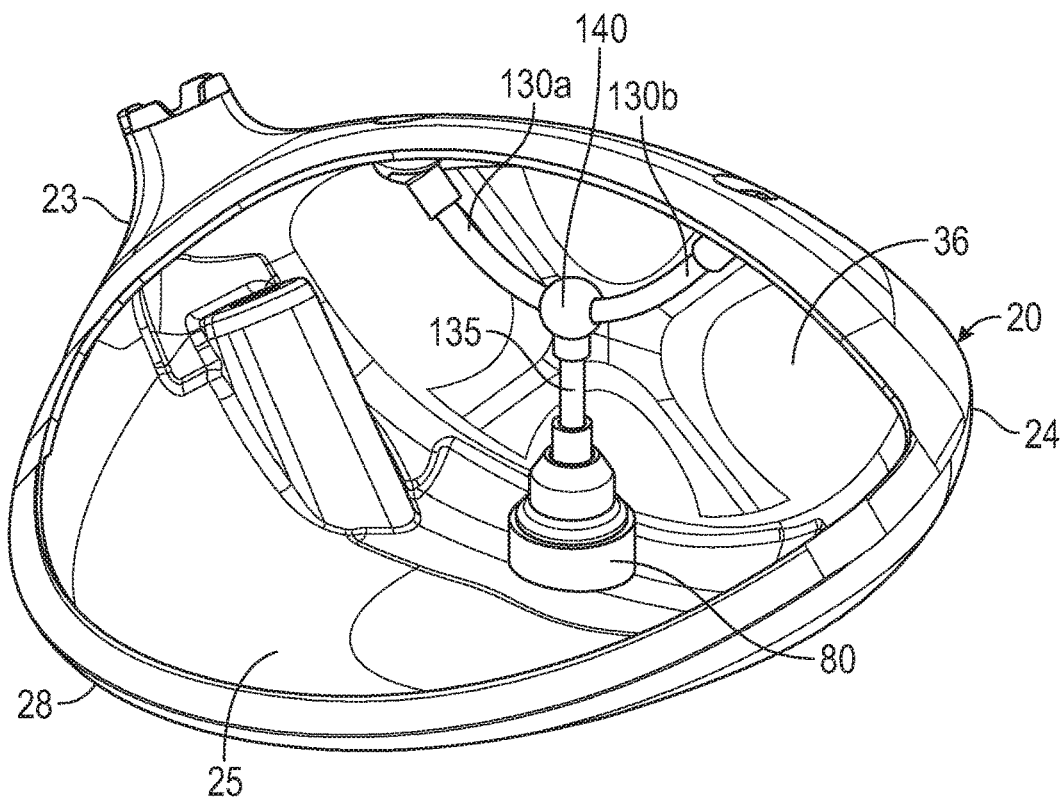
FIG. 15 is a top perspective view of another alternative embodiment of the golf club head of the present invention.
Figure 16:
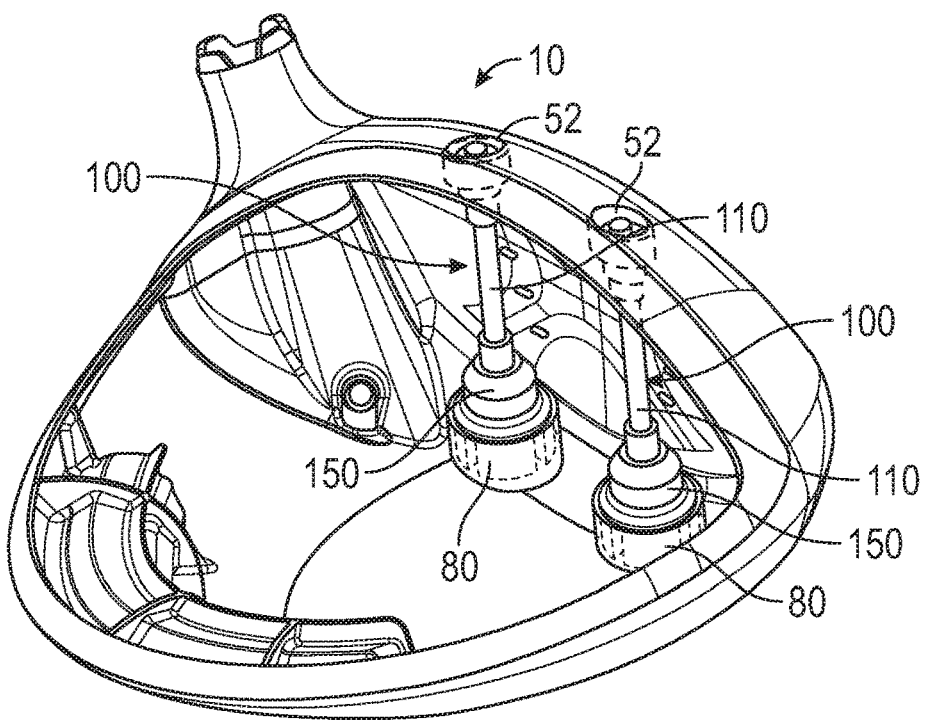
FIG. 16 is a top perspective view of another alternative embodiment of the golf club head of the present invention.
Figure 17:
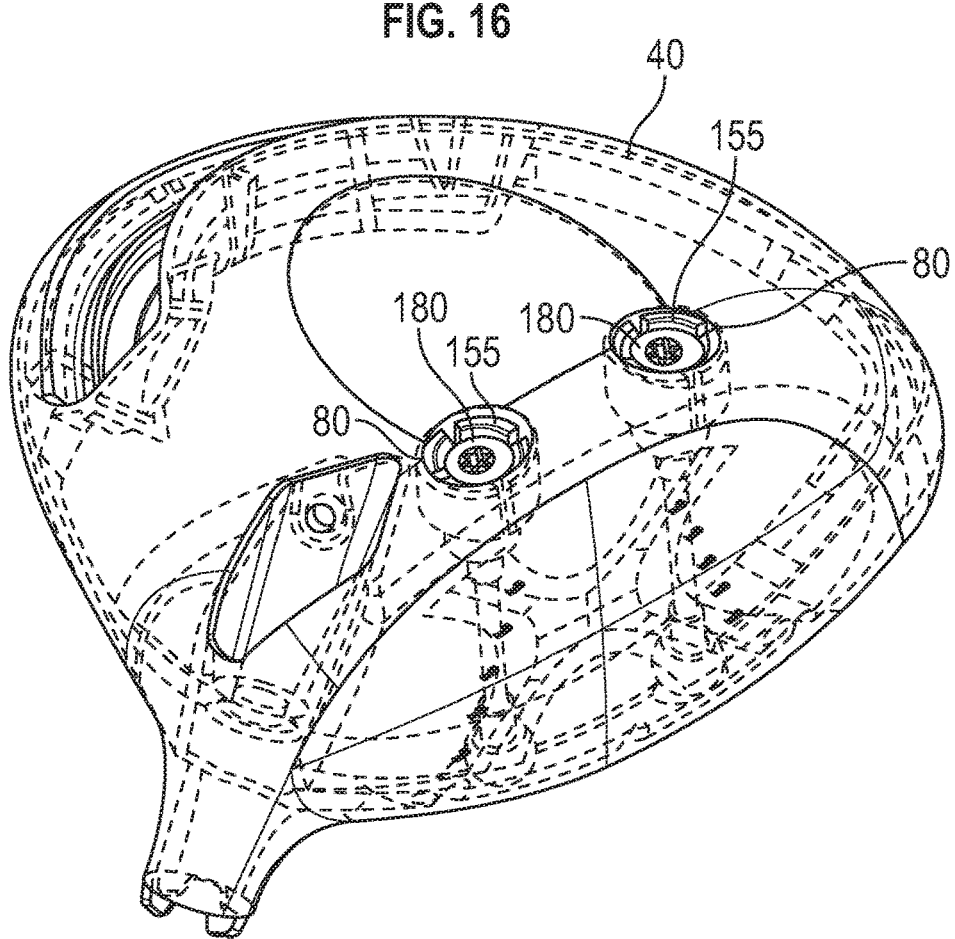
FIG. 17 is a partially transparent, bottom, perspective view of the embodiment shown in FIG. 16.
Figure 18:
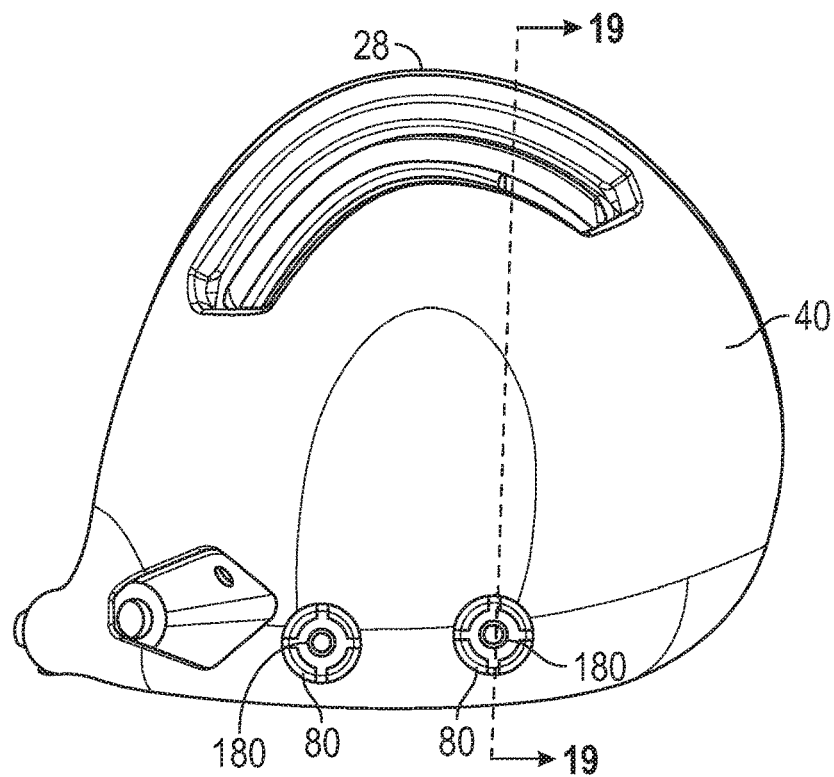
FIG. 18 is a bottom plan view of the embodiment shown in FIG. 16.
Figure 19:
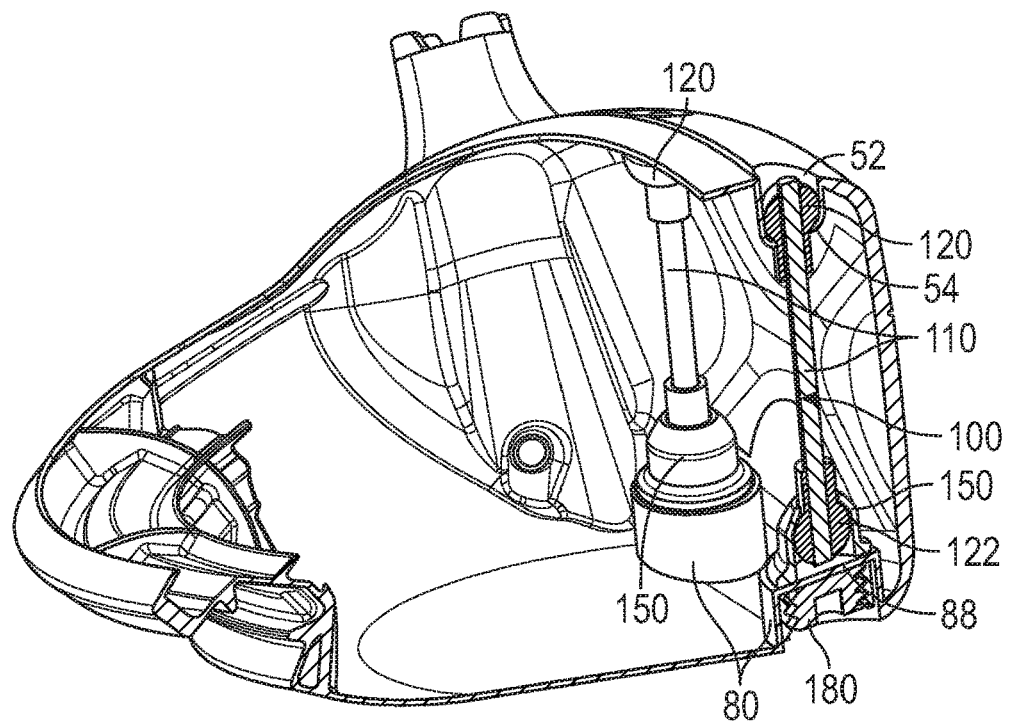
FIG. 19 is a cross-sectional view of the embodiment shown in FIG. 18 along lines 19-19.
Figure 20:
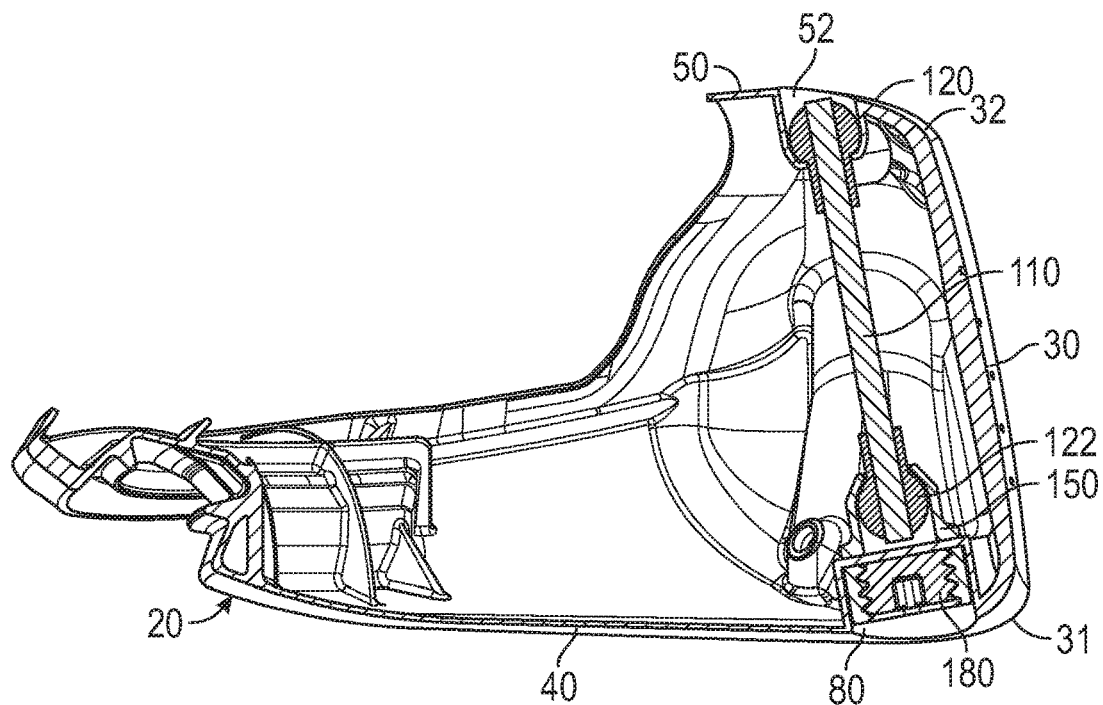
FIG. 20 is a side plan view of the embodiment shown in FIG. 19.

In alternative embodiments, the cable assembly 100 may include different numbers of upper cable portions 130 attached to a lower cable portion 135 via connector hub 140, an example of which (two upper cable portions 130a, 130b forming a y-shaped assembly) is shown in FIG. 15. In still other embodiments, the cable assembly 100 may lack a connector hub 140 altogether, and directly connect a single unthreaded bore 52 to a single port 80 (FIG. 14) or connect multiple unthreaded bores 52 to multiple ports 80 (FIGS. 16-20). In the embodiment shown in FIGS. 16-20, the cable assemblies 100 preferably have the spacing from one another and the rear surface 36 of the striking face section 30 disclosed in any of U.S. Pat. Nos. 9,486,677, 9,597,558, 9,597,561, 9,687,701, 9,687,702, 9,694,257, 9,757,629, 9,776,058, 9,814,947, 9,821,199, 9,855,476, and 9,889,349, the disclosure of each of which is hereby incorporated by reference in its entirety herein.

The cable assembly 100 is attached to the body 20 of the golf club head 10 by threading the cable portion 110 or upper cable portions 130a, 130b, 130c through the unthreaded bores 52 so that the ball joint connector 120 abuts the flange. Before the ball joint connector 122 is affixed to the lower end 114 of the cable portion 110 or lower cable portion 135, the lower end 114 is threaded through the upper opening 152 of a hollow sleeve 150. The hollow sleeve 150 is a bell-shaped structure having a through-bore 153 extending from the upper opening 152 into a hollow interior 154 defined by a wall portion 155 having an unthreaded exterior surface 156 and a threaded interior surface 157. The upper opening 152 is encircled by a sleeve flange 151, which preferably has a concave curvature that engages with the curvature of the ball joint connector 122. The wall portion 155 is divided up into four segments 155a, 155b, 155c, 155d by four slots 158a, 158b, 158c, 158d, each of which is sized to receive one of the plurality of struts 86a, 86b, 86c, 86d. Affixing the lower end 114 to the ball joint connector 122 effectively traps the hollow sleeve 150 on the cable portion 110 without restricting the hollow sleeve's 150 ability to move along the length $L_2$ of the cable portion 110.

Once the hollow sleeve 150 is trapped on the cable portion 110, the hollow sleeve 150 is connected to the port 80 by inserting the struts 86a, 86b, 86c, 86d into the slots 158a, 158b, 158c, 158d so that the abutment portion 88 is disposed within the hollow interior 154, as shown in FIGS. 8, and 11-13. The hollow sleeve 150 is then reversibly secured within the port 80, and to the sole 40, with a screw plug 180. The screw plug 180 has a threaded exterior surface 182 with threads that are sized to mate with the threads on the threaded interior surface 157 of the hollow sleeve 150. The screw plug 180 also has an upper surface 184 with a tool engagement portion 185, and a bottom surface 186 that abuts the abutment portion 88 of the port 80 when the screw plug 180 is screwed into hollow sleeve 150. Tightening the screw plug 180 within the hollow sleeve presses the bottom surface 186 against the abutment portion 88 and pulls the hollow sleeve 150, and thus the cable portion 110, downwards away from the return section 50, placing the cable portion 110 in tension within the body 20, and effectively preloading the striking face section 30 to improve its performance when it makes contact with a golf ball.

The cable assembly 100, when engaged with the body 20, preferably is located entirely within 1 inch of the rear surface 36 of the striking face section 30 along the vertical plane 90. Similarly, the unthreaded bores 52 and the port 80 are disposed within 1 inch of the rear surface 36 along the vertical plane 90 or in a striking face section 30 to aft end 28 direction. It is even more preferable that the cable assembly 100 be spaced no more than 0.500 inch from the rear surface 36, and in some embodiments the cable assembly is at least partially (if not completely) located within 0.250 inch of the rear surface 36. It is preferable that at least a portion of the cable assembly 100, and particularly one or more of the cable portions 110, 130, 135 of the cable assembly 100, extends approximately parallel with the rear surface 36 of the striking face section 30.

The ball joint connectors 120, 122 may, in alternative embodiments, be replaced with other connectors or structures that function to prevent the cable portion 110 or upper cable portions 130 from disengaging from the body 20 and the hollow sleeve 150. The ball joint connectors 120, 122, hollow sleeve 150, and screw plug 180 preferably are composed of a lightweight, strong material such as stainless steel, titanium alloy, aluminum alloy, composite, plastic, or other such material known to a person skilled in the art.

Figure 21:
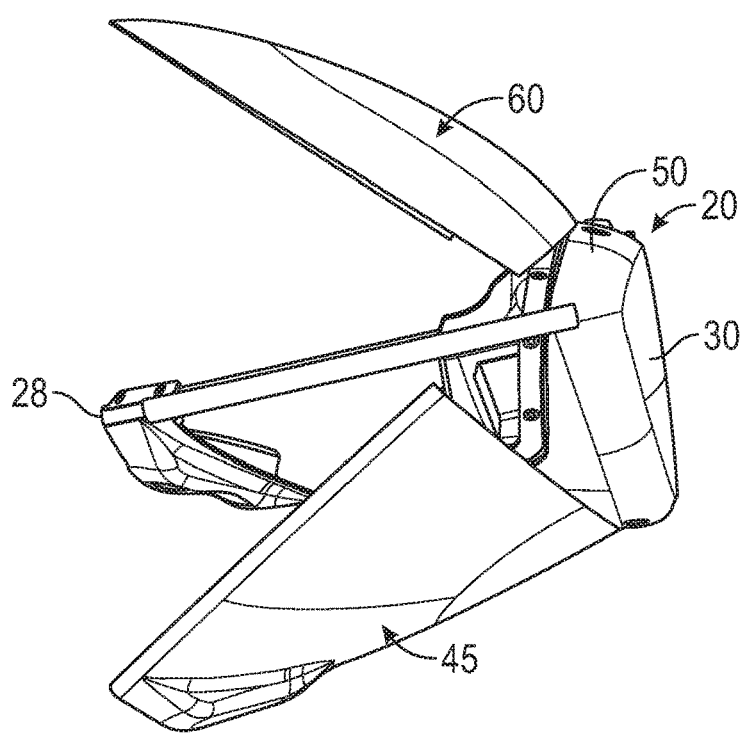
FIG. 21 is a side perspective view of an alternative embodiment the golf club of the present invention with hinged crown and sole portions.
Figure 22:
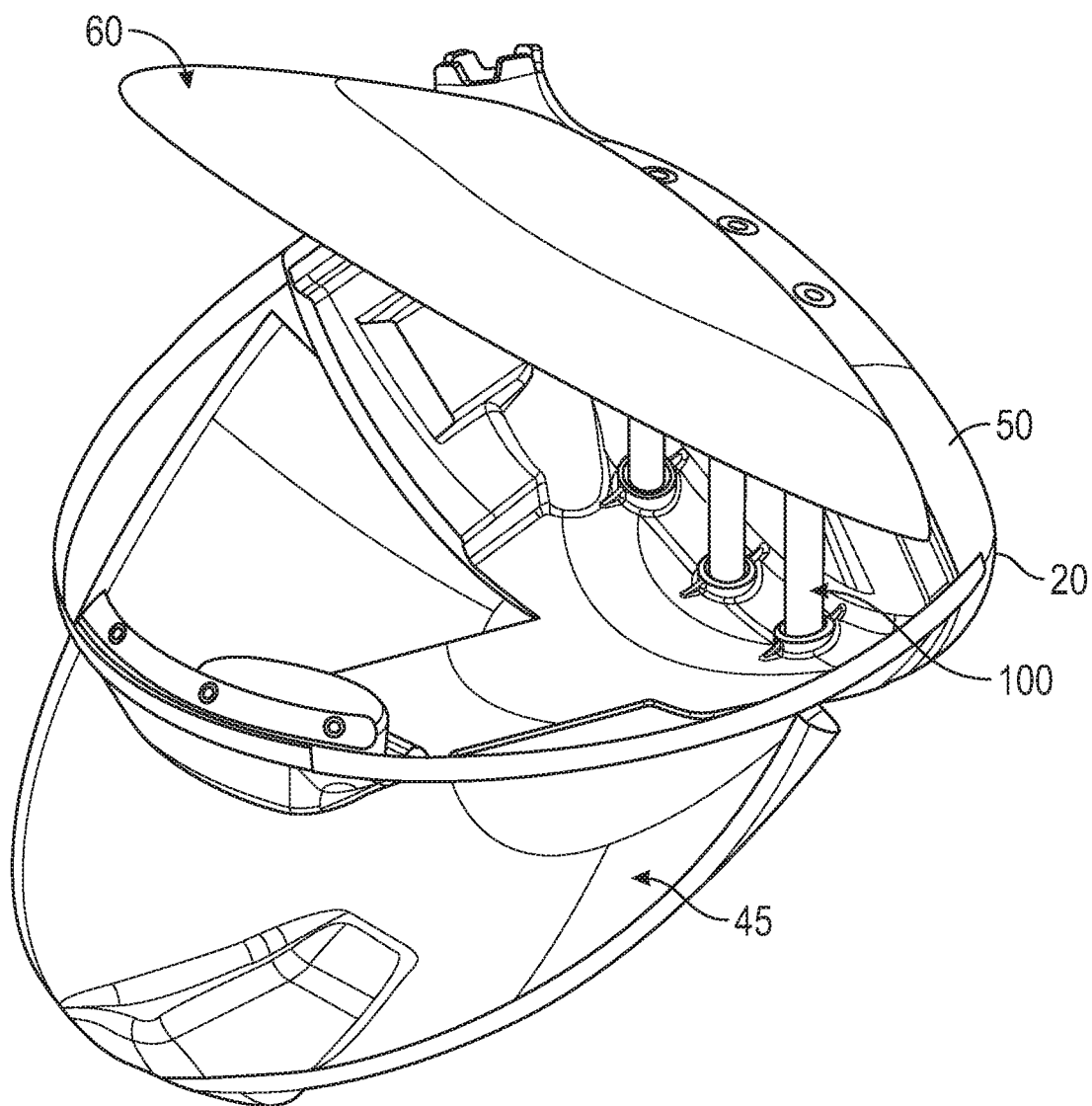
FIG. 22 is a top perspective view of the embodiment shown in FIG. 21.

The body 20 preferably has a volume of 200 cubic centimeters to 600 cubic centimeters, more preferably 300 cubic centimeters to 500 cubic centimeters, and most preferably 420 cubic centimeters to 470 cubic centimeters, with a most preferred volume of 450 to 460 cubic centimeters. The body preferably is formed from a titanium alloy such as 6-4 titanium alloy, alpha-beta titanium alloy or beta titanium alloy for forging, and 6-4 titanium for casting. Alternatively, the body 20 is composed of 17-4 steel alloy. In some embodiments, the crown 60 may be affixed to the return section 50 via a hinge so that the golf club head 10 can be opened and the cable assemblies 100 accessed, as shown in FIGS. 21-22; similarly, and as shown in these Figures, the golf club head 10 may also include a sole cover 45 that is fixed to the body 20 proximate the striking face section 30 via a hinge.

The striking face section 30 preferably has a varying thickness such as that described in U.S. Pat. No. 7,448,960, for a Golf Club Head With Variable Face Thickness, which is hereby incorporated by reference. Other alternative embodiments of the thickness of the striking face section 30 are disclosed in U.S. Pat. No. 6,398,666, for a Golf Club Striking Plate With Variable Thickness, U.S. Pat. No. 6,471,603, for a Contoured Golf Club Face and U.S. Pat. No. 6,368,234, for a Golf Club Striking Plate Having Elliptical Regions Of Thickness, all of which are owned by Callaway Golf Company and which are hereby incorporated by reference. Alternatively, the striking face section 30 may have a uniform thickness.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes, modifications and substitutions of equivalents may be made therein without departing from the spirit and scope of this invention which is intended to be unlimited by the foregoing except as may appear in the following appended claims. Therefore, the embodiments of the invention in which an exclusive property or privilege is claimed are defined in the following appended claims.

I claim:

1. A golf club head comprising:
a body comprising a crown section, a face section, and a sole section; and
at least one cable assembly comprising a cable portion having a first diameter, a first connector, and a second connector;
a sleeve comprising a through opening, a sleeve flange at least partially encircling the through opening, and a wall portion at least partially defining a hollow interior and having an exterior surface, an interior surface comprising a first plurality of threads, and at least one slot extending from a terminal edge of the wall; and
a plug comprising an upper surface having a tool engagement portion, a lower surface, and an exterior surface comprising a second plurality of threads sized to engage with the first plurality of threads,
wherein each of the first connector and second connector has a diameter that is greater than the first diameter,
wherein one of the crown section and the sole section comprises a first through-bore at least partially encircled by a retention flange,
wherein the other of the crown section and the sole section comprises a second through-bore comprising a retention structure,
wherein the retention structure comprises at least one strut sized to fit within the at least one slot and an abutment portion suspended within the second through-bore by the at least one strut,
wherein the cable portion extends through the first through-bore so that the first connector abuts the retention flange,
wherein the cable portion extends through the through opening of the sleeve so that the second connector is disposed within the hollow interior and abuts the sleeve flange,
wherein the at least one strut is disposed within the at least one slot so that the abutment portion is received within the hollow interior of the sleeve, and
wherein the plug is disposed within hollow interior of the sleeve so that the first plurality of threads engages the second plurality of threads and the lower surface abuts the abutment portion.

2. The golf club head of claim 1, wherein the sleeve is approximately bell-shaped.

3. The golf club head of claim 1, wherein the at least one slot comprises first, second, third, and fourth slots, and wherein the retention structure comprises first, second, third, and fourth struts.

4. The golf club head of claim 1, wherein the first connector is a first ball joint, and wherein the second connector is a second ball joint.

5. The golf club head of claim 4, wherein the first ball joint is permanently affixed to a first end of the cable portion, and wherein the second ball joint is permanently affixed to a second end of the cable portion.

6. The golf club head of claim 4, wherein the retention flange has a concave curvature.

7. The golf club head of claim 4, wherein each of the ball joint connectors, the sleeve, and the plug is composed of a metal material selected from the group consisting of steel, titanium alloy, and aluminum alloy.

8. The golf club head of claim 1, wherein each of the first through-bore and the second through-bore is disposed within 1 inch of the face.

9. The golf club head of claim 1, wherein no portion of the cable assembly is spaced further than 1.00 inch from an interior surface of the face section along a vertical plane extending perpendicular to the face section.

10. The golf club head of claim 8, wherein the cable assembly is spaced no further than 0.500 inch from the interior surface of the face section.

11. The golf club head of claim 9, wherein the cable assembly is spaced approximately 0.250 inch from the interior surface of the face section.

12. The golf club head of claim 1, wherein no portion of the cable assembly contacts any portion of the striking face.

13. The golf club head of claim 1, wherein the first and second through-bores are vertically aligned with each other along a vertical plane extending parallel with an internal surface of the face.

14. The golf club head of claim 1, wherein tightening the plug within the sleeve places the cable portion in tension, and wherein loosening the plug within the sleeve reduces tension in the cable portion.

15. The golf club head of claim 1, wherein the cable portion comprises braided wire.

16. The golf club head of claim 1, wherein the cable portion comprises a polymer material.

17. The golf club head of claim 1, wherein the cable portion is tinted.

18. The golf club head of claim 1, wherein the body has a volume of 300 to 500 cubic centimeters.

19. The golf club head of claim 1, wherein the body is composed of a metal material selected from the group consisting of steel and titanium alloy.

20. The golf club head of claim 1, further comprising a sole cover, wherein the sole cover is attached to the body proximate the face section.

\* \* \* \* \*